(12) United States Patent
Eom

(10) Patent No.: US 10,412,933 B2
(45) Date of Patent: Sep. 17, 2019

(54) ANIMAL HOUSEBREAKING DEVICE AND ANIMAL HOUSEBREAKING SYSTEM INCLUDING THE SAME

(71) Applicant: SALTNLIGHT INC., Daejeon (KR)

(72) Inventor: Bo Yun Eom, Daejeon (KR)

(73) Assignee: SALTNLIGHT INC., Daejeon (KR)

( * ) Notice: Subject to any disclaimer, the term of this patent is extended or adjusted under 35 U.S.C. 154(b) by 0 days.

(21) Appl. No.: 15/940,114

(22) Filed: Mar. 29, 2018

(65) Prior Publication Data

US 2018/0213748 A1 Aug. 2, 2018

Related U.S. Application Data

(63) Continuation of application No. PCT/KR2016/010974, filed on Sep. 30, 2016.

(30) Foreign Application Priority Data

Oct. 2, 2015 (KR) .................... 10-2015-0139385

(51) Int. Cl.
| | |
|---|---|
| A01K 15/02 | (2006.01) |
| A01K 1/01 | (2006.01) |
| A01K 23/00 | (2006.01) |
| A01K 5/02 | (2006.01) |
| A01K 29/00 | (2006.01) |

(52) U.S. Cl.
CPC .......... *A01K 15/021* (2013.01); *A01K 1/0107* (2013.01); *A01K 5/0283* (2013.01); *A01K 23/00* (2013.01); *A01K 5/02* (2013.01); *A01K 29/005* (2013.01)

(58) Field of Classification Search
CPC .......... A01K 15/02; A01K 1/0107; A01K 1/01
See application file for complete search history.

(56) References Cited

U.S. PATENT DOCUMENTS

| | | | | | |
|---|---|---|---|---|---|
| 5,148,768 | A | * | 9/1992 | Hinton ................. | A01K 1/0107 119/482 |
| 5,353,743 | A | * | 10/1994 | Walton ................. | A01K 1/0107 119/165 |
| 5,355,837 | A | * | 10/1994 | Reyes .................. | A01K 1/0107 119/161 |
| 6,041,737 | A | * | 3/2000 | Hennigan ............ | A01K 1/0107 119/161 |

(Continued)

FOREIGN PATENT DOCUMENTS

| | | | | | |
|---|---|---|---|---|---|
| JP | 2016123397 A | * | 7/2016 | ............ | A01K 1/011 |
| KR | 10-2009-0121915 A | | 11/2009 | | |

(Continued)

OTHER PUBLICATIONS

International Search Report; issued in PCT/KR2016/010974; dated Dec. 8, 2016.

*Primary Examiner* — Magdalena Topolski
(74) *Attorney, Agent, or Firm* — Studebaker & Brackett PC

(57) ABSTRACT

An animal housebreaking system including at least a defecation sensing unit for sensing whether an animal defecates on the animal housebreaking device, and a feeding machine for receiving, from the animal housebreaking device, information on whether the animal defecates, and providing predetermined rewards when the animal defecates on the animal housebreaking device.

7 Claims, 4 Drawing Sheets

(56) References Cited

U.S. PATENT DOCUMENTS

| | | | | |
|---|---|---|---|---|
| 6,367,417 B1* | 4/2002 | Gal | A01K 5/0283 119/51.11 |
| 6,756,521 B1* | 6/2004 | Breitkopf | A61F 13/42 340/604 |
| 6,860,239 B1* | 3/2005 | Begun | A01K 1/035 119/712 |
| 8,776,730 B2* | 7/2014 | Levi | G09B 19/00 119/712 |
| 8,878,680 B2* | 11/2014 | Clary | A01K 1/0107 340/573.1 |
| 8,925,485 B2* | 1/2015 | Pu | A01K 5/0114 119/51.02 |
| 9,585,366 B2* | 3/2017 | Ault | A01K 1/0107 |
| 2004/0050342 A1* | 3/2004 | Armstrong | A01K 5/02 119/707 |
| 2007/0051317 A1* | 3/2007 | Bruner | A01K 1/0107 119/53 |
| 2008/0072834 A1* | 3/2008 | Makem | A01K 1/0107 119/169 |
| 2008/0196671 A1* | 8/2008 | Dukes | A01K 1/0114 119/163 |
| 2009/0314223 A1* | 12/2009 | Yuu | A01K 15/02 119/720 |
| 2010/0047119 A1* | 2/2010 | Cressy | A01K 1/0107 422/5 |
| 2010/0064975 A1* | 3/2010 | McElroy, Jr. | A01K 1/0107 119/61.55 |
| 2012/0299731 A1* | 11/2012 | Triener | G01G 17/08 340/573.1 |
| 2013/0220235 A1* | 8/2013 | Wisdom | A01K 15/02 119/719 |
| 2014/0060441 A1* | 3/2014 | Baxter | A01K 5/0291 119/61.5 |
| 2014/0311415 A1* | 10/2014 | Tanigawa | A01K 29/005 119/163 |
| 2014/0331749 A1* | 11/2014 | Perissi | A01K 1/0107 73/73 |
| 2015/0342150 A1* | 12/2015 | Womble | A01K 27/009 119/718 |
| 2016/0324121 A1* | 11/2016 | Rains | A01K 15/021 |
| 2017/0188539 A1* | 7/2017 | Orgias | A01K 1/0107 |
| 2017/0251633 A1* | 9/2017 | Womble | A61B 34/10 |

FOREIGN PATENT DOCUMENTS

| | | | | |
|---|---|---|---|---|
| KR | 10-2015-0031921 A | 3/2015 | | |
| KR | 10-2015-0033390 A | 4/2015 | | |
| WO | WO-2006083123 A1 * | 8/2006 | | A01K 1/0107 |
| WO | WO-2013014304 A1 * | 1/2013 | | A01K 1/0107 |
| WO | WO-2016013990 A1 * | 1/2016 | | A01K 1/0107 |

* cited by examiner

ANIMAL HOUSEBREAKING DEVICE AND ANIMAL HOUSEBREAKING SYSTEM INCLUDING THE SAME

CROSS-REFERENCE TO RELATED APPLICATIONS

The present application is a continuation of International Patent Application No. PCT/KR2016/010974, filed on Sep. 30, 2016, which is based upon and claims the benefit of priority to Korean Patent Application No. 10-2015-0139385, filed on Oct. 2, 2015. The disclosures of the above-listed applications are hereby incorporated by reference herein in their entirety.

BACKGROUND

Embodiments of the inventive concept described herein relate to an animal housebreaking device and an animal housebreaking system including the same, and more particularly, relate to an animal housebreaking device that efficiently performs housebreaking that is one of a process that is most difficult but essential in housebreaking a pet by using the Internet of Things (IoT) technology, and an animal housebreaking system including the same.

In general, the first communication aimed at communication between persons (person-to-person), but as the technologies have developed, the machine-to-machine (M2M) technology of allowing communication between machines or devices without direction control or intervention of a person has appeared.

The machine-to-machine (M2M) communication that is also defined as communication between devices and things while a person does not intervene in the communication or minimally intervenes in the communication started with the development of the RFID technology in early 2000s, and in recent years, has been combined with the wireless communication technology to develop to the Internet of Things for identifying state information such as things, persons, and environments of the remote sites. That is, the M2M communication and the Internet of Things are connected to a network through a communication device attached to a device or constitute a communication network between devices so that their concepts of transmitting and receiving information are the same.

The Internet of Things related markets may be classified into devices on which sensors are mounted, a network for transmitting and receiving data acquired by the devices, a platform for creating useful information by managing the data collected by the devices and providing the information to a service, and a software (service) that provides an additional service to the user by using the information on the platform.

The Internet of Things environment that extends to various additional services by using the information created between things often requires intelligence according to the roles of the devices. In recent years, the services and products using the Internet of Things ranging from small daily supplies, such as toothbrushes, diapers, and forks, to infrastructures, such as cities, factories, and circulations, have been developed worldwide.

However, the devices and services related to pets using the Internet of Things are staying in devices on which sensors for measuring motion information of animals are mounted, and automatic food providers that detect a state of an animal through a web camera and control an opening/closing unit of the feed provider to supply a food.

SUMMARY

Meanwhile, due to the increase of one person households and old populations, populations who emotionally depend on pets also are increasing, and there is a room for providing various conveniences to the owners of pets through device and services related to pets using the Internet of Things, considering that the pets are becoming not simple animals but companion animals that are organic bodies that live, console, please the owners while living together throughout their lives.

As representative examples, one of the issues of the pet owners is training the animals. Among them, the housebreaking at a predetermined site is one of the processes that make the owners of the pets tough. In usual cases, the training is performed by praising the pets and giving rewards by supplying snack foods when they perform the indications properly, and scolding them otherwise.

However, because the housebreaking is possible only when the owners are together with the pets is hot solved with short time training, the owners have difficulties in housebreaking the pets.

In order to solve the above-mentioned problems, the inventive concept provides an animal housebreaking device that may housebreak an animal without direction intervention of a person, and an animal housebreaking system.

The inventive concept also provides an animal housebreaking device that may prevent the owners of pets from undergoing bothersome and tough processes by automatically giving a reward to the pets to housebreak the pets when the pets defecate on the animal housebreaking device that is a predetermined area, and an animal housebreaking system.

The inventive concept also provides an animal housebreaking device that may manage a heath state of an animal through identification of a defecation state of the animal and adjustment of the amount of a food provided to the animal, and an animal housebreaking system.

The technical objects of the inventive concept are not limited to the above-mentioned one, and the other unmentioned technical objects will become apparent to those skilled in the art from the following description.

In accordance with an aspect of the inventive concept, there is provided an animal housebreaking system including an animal housebreaking device including a defecation detector configured to detect whether an animal defecated on the animal housebreaking device; and a food provider configured to receive information on whether the animal defecated from the animal housebreaking device and provide a predetermined reward when the animal defecated on the animal housebreaking device.

In accordance with another aspect of the inventive concept, there is provided an animal housebreaking device including a defecation detector configured to detect whether an animal defecated on the animal housebreaking device, and an device communication unit configured to, when the animal defecates on the animal housebreaking device, provide information on whether the animal defecated to an external device such that a predetermined reward is provided to the animal.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
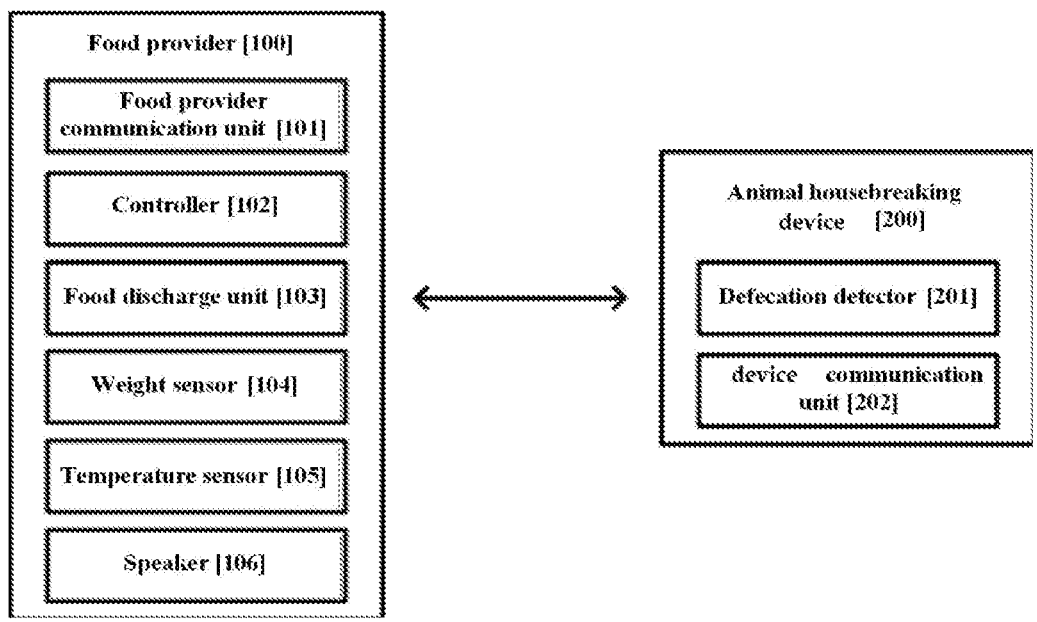
FIG. 1 is a block diagram schematically illustrating a configuration of an animal housebreaking system according to a first embodiment of the inventive concept.

The above and other aspects, features and advantages of the invention will become apparent from the following description of the following embodiments given in conjunction with the accompanying drawings. However, the inventive concept is not limited to the embodiments disclosed below, but may be implemented in various forms. The embodiments of the inventive concept are provided to make the disclosure of the inventive concept complete and fully inform those skilled in the art to which the inventive concept pertains of the scope of the inventive concept.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other elements, in addition to the aforementioned elements. Throughout the specification, the same reference numerals dente the same elements, and "and/or" includes the respective elements and all combinations of the elements. Although "first", "second" and the like are used to describe various elements, the elements are not limited by the terms. The terms are used simply to distinguish one element from other elements. Accordingly, it is apparent that a first element mentioned in the following may be a second element without departing from the spirit of the inventive concept.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other elements, in addition to the aforementioned elements. Throughout the specification, the same reference numerals dente the same elements, and "and/or" includes the respective elements and all combinations of the elements. Although "first", "second" and the like are used to describe various elements, the elements are not limited by the terms. The terms are used simply to distinguish one element from other elements. Accordingly, it is apparent that a first element mentioned in the following may be a second element without departing from the spirit of the inventive concept.

Further, the terms, such as "unit", "-er, -or", and "module" described in the specification mean a unit for processing at least one function or operation, and may be implemented by hardware, software, or a combination of hardware and software.

Meanwhile, in the embodiments of the inventive concept, the elements, the functional blocks, or the means may include one or more lower elements, and the electric, electronic, and mechanical functions performed by the elements may be realized by various known devices or mechanical elements such as electronic circuits, integrated circuits, and application specific integrated circuits (ASICs), and may be separately realized or may be integrated into one.

Hereinafter, configurations and operational effects of an animal housebreaking device and an animal housebreaking system using Internet of Things (IoT) will be described in more detail with reference to the accompanying drawings.

First, an animal housebreaking system according to an embodiment of the inventive concept will be described with reference to FIG. 1. Referring to FIG. 1, a block diagram schematically illustrating a configuration of an animal housebreaking system according to a first embodiment of the inventive concept is illustrated.

Referring to FIG. 1, the animal housebreaking system according to the first embodiment of the inventive concept may include a food provider 100 and an animal housebreaking device 200.

For example, because the animal housebreaking device 200 may detect whether an animal defecated on the animal housebreaking device 200 and the food provider 100 may receive information on whether the animal defecated from the housebreaking device 200 and provide a predetermined reward when the animal defecated on the animal housebreaking device 200, animal housebreaking may be performed by using the animal housebreaking system according to the embodiment of the inventive concept.

In detail, although the food provider 100 that provides a food (feed) to an animal may include a food provider communication unit 101, a controller 102, a food discharge unit 103, a weight sensor 104, a temperature sensor 105, and a speaker 106, the inventive concept is not limited thereto but the food provider 100 may have a larger number of elements or a smaller number of elements than the elements illustrated in FIG. 1 in some embodiments. For example, in some embodiments, only the food provider 100 may be used while the animal housebreaking device 200 is not employed.

The food provider communication unit 101 allows wired/wireless network communication, and may communication with external devices including the animal housebreaking device 200. For example, the food provider communication unit 101 may receive defecation information of an animal, including information whether the animal defecated, from the animal housebreaking device 200, but the inventive concept is not limited thereto.

The controller 102 is a module that controls an operation of the food provider 100, and for example, may discharge a food by controlling the food discharge unit 103 or output a predetermined voice by controlling the speaker 106 when an animal defecated on the animal housebreaking device 200 based on the received information on whether the animal defecated, but the inventive concept is not limited thereto.

Meanwhile, in some embodiments, based on the defecation information received from the animal housebreaking device 200, the controller 102 may change the amount or the kind of the food discharged through the food discharge unit 103 when the animal defecated on the animal housebreaking device 200. For example, the amount or the kind of the food discharged through the food discharge unit 103 may be changed by the controller 102 based on the weight of defecation included in the defecation information or defecation state information, but the inventive concept is not limited thereto.

The food discharge unit 103 may store a food that may be a feed of an animal in the interior thereof, and may discharge the food stored in the food provider 100 such that the animal may take the food. To achieve this, the food discharge unit 103 may include an opening/closing unit that is opened and closed in a fully automatic scheme on at least one surface thereof, and the opening/closing unit of the food discharge unit 103 may be opened and closed by the controller 102.

For example, the food discharge unit 103 may be configured such that the food stored in the interior of the food discharge unit 103 is discharged to the outside of the food discharge unit 103 while the opening/closing unit is opened and closed under the control of the controller 102 if the food discharge unit 103 receives information on whether the animal defecated from the animal housebreaking device 200 through the communication unit 101. Accordingly, the inventive concept may provide a training effect of giving a reward if the animal defecates on the animal housebreaking device 200 because a food may be provided to the animal through the food discharge unit 103 when the animal successfully defecates on the animal housebreaking device 200.

In some embodiments, two or more kinds of foods that may be the feeds of the animal may be stored in the interior of the food discharge unit 103, and a food selected under the control of the controller 102 may be discharged from the food discharge unit 103.

The weight sensor 104 may measure the weight of the food discharged from the food discharge unit 103 and to achieve this, the weight sensor 104 may be provided in the food discharge unit 103, but the inventive concept is not limited thereto but in some embodiments, the weight sensor 104 may be provided outside the food discharge unit 103 and the disposition location of the weight sensor 104 is not limited.

In detail, the weight sensor 104 may measure the weight of the food stored in the food discharge unit 103 or the food provided to the animal in real time, but the inventive concept is not limited thereto.

In the animal housebreaking system according to an embodiment of the inventive concept, the amount of the food provided to the animal may be precisely controlled because the food provider 100 includes the weight sensor 104. Accordingly, the amount of the food provided to the animal may be controlled or adjusted according to the state of the animal.

The temperature sensor 105 may detect a situation of the animal by measuring the temperature of the animal located around the food provider.

The speaker 106 outputs a sound, and when the animal defecates on the animal housebreaking device 200, the speaker 106 may output a predetermined voice under the control of the controller 102. For example, the speaker 106 may include a microphone and a storage unit, but the inventive concept is not limited thereto.

Here, the predetermined voice may be a voice of the owner of the animal and may be a voice, such as "You did a good job.", to praise that the animal defecated on the animal housebreaking device 200, but the inventive concept is not limited thereto.

Meanwhile, the animal housebreaking device 200 may function as a defecation area that induces the animal to defecate in the animal housebreaking system, and may detect whether the animal defecated on the animal housebreaking device 200. For example, the animal housebreaking device 200 may be of a pad type, but the inventive concept is not limited thereto and the animal housebreaking device 200 may be realized in various types, shapes, and structures.

The animal housebreaking device 200 may include a defecation detector 201 and a device communication unit 202.

The defecation detector 201 may detect whether the animal defecated on the housebreaking pad 200. In detail, the defecation detector 201 may include a sensor for detecting whether an animal defecated on the housebreaking pad 200, for example, may include a moisture detection device, but the inventive concept is not limited thereto and the defecation detector 201 may include a known device that may detect whether an animal defecated by measuring a change of, for example, a temperature, a humidity, and a smell of a surrounding environment as the animal defecates.

Further, the defecation detector 201 may include a weight sensor that measures a weight of defecation of an animal for management of health and obesity of the animal as well as for detection of a defecation or may include a defecation measuring unit that may recognize the components of the defecation of the animal, but the inventive concept is not limited thereto.

Accordingly, the defecation information generated by the defecation detector 201 may include defecation weight information or defecation state information, including whether an animal defecated, but the inventive concept is not limited thereto.

The device communication unit 202 allows wired/wireless network communication, and may communicate with external devices including the food provider 100. For example, the device communication unit 202 may provide information on whether an animal defecated such that a predetermined reward may be provided to the animal when the animal defecated on the animal housebreaking device 200.

The housebreaking of an animal through the animal housebreaking system according to the embodiment of the inventive concept may be performed as follows.

That is, when an animal defecates on the animal housebreaking device 200, the defecation detector 201 mounted on the animal housebreaking device 200 detects the fact and generates defecation information, and the device communication unit 202 transmits defection information to the food provider communication unit 101 of the food provider 100.

The controller 102 of the food provider 100 that received the defecation information from the animal housebreaking device 200 may provide a predetermined reward based on the defecation information, for example, may provide a predetermined food or provide a predetermined voice, and in some embodiments, the amount of the food discharged through the food discharge unit 103 may be adjusted by using the weight sensor 104. In detail, a food may be provided to an animal through the food discharge unit 103 or a voice of the owner that praises the animal may be output through the speaker 106, and accordingly, housebreaking may be performed by naturally giving a reward according to the defecation of the animal.

Figure 2:
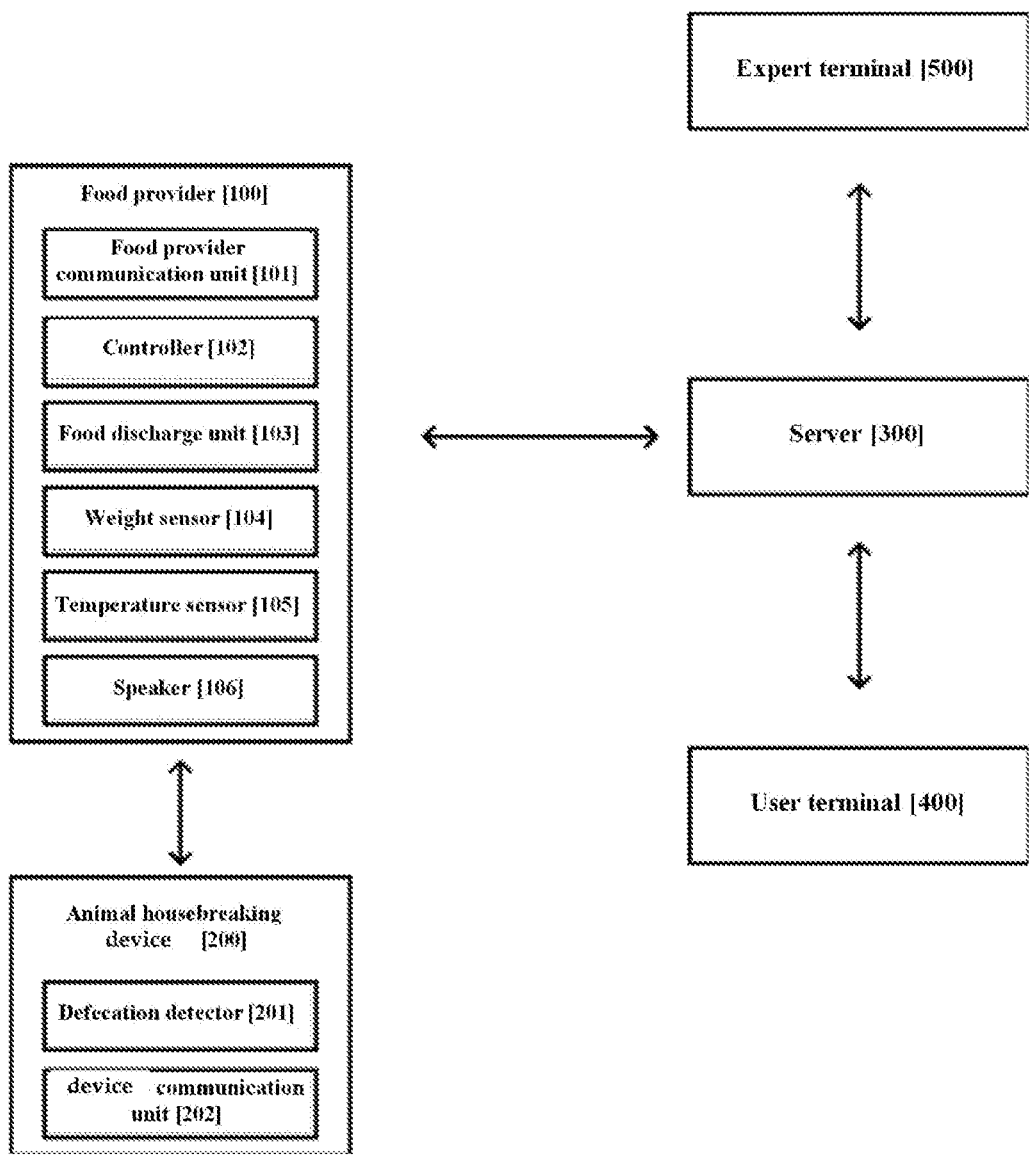
FIG. 2 is a block diagram schematically illustrating a configuration of an animal housebreaking system according to a second embodiment of the inventive concept.

Hereinafter, an animal housebreaking system according to a second embodiment of the inventive concept will be described with reference to FIG. 2. Meanwhile, a difference between the animal housebreaking system according to the first embodiment of the inventive concept and the animal housebreaking system according to the second embodiment of the inventive concept will be mainly described. Referring to FIG. 2, a block diagram illustrating a schematic configuration of an animal housebreaking system according to the second embodiment of the inventive concept is illustrated.

Referring to FIG. 2, the animal housebreaking system according to the second embodiment of the inventive concept may further include a server 300, a user terminal 400, and an expert terminal 500, and pets may be efficiently managed through the configuration and in particular, the health of the animals may be managed.

The server 300 may perform communication with the food provider 100, the user terminal 400, and the expert terminal 500.

In detail, the server 300 may include a database that may store command information transmitted from the user terminal 400 or the expert terminal 500, information transmitted from the food provider 100, information on the user who may access the server 300, and information on the food provider 100, and an authentication module that performs a user authentication when the owner tries to access the food provider 100 through the user terminal 400, but the inventive concept is not limited thereto.

The server 300 may perform a function of connecting the user terminal 400 and the expert terminal 500 to the food provider 100, may provide the information received from the food provider 100 to the user terminal 400 and the expert terminal 500, and may receive a command for controlling the food provider 100 from the user terminal 400 and the expert terminal 500.

The user terminal 400, for example, may be a terminal that is used by the owner of a pet and a user interface (UI) may be provided to the user terminal 400, and the owner of the pet may control the food provider 100 through the user terminal 400 and may inquire the information transmitted from the food provider 100 through the server 300.

The expert terminal 500 may be a terminal that is used by a veterinarian or a certified animal expert. The expert terminal 500 may access the server 300 by using a network to recognize a state of an animal through the information stored in the server 300 and input an opinion on the state of the animal to the server 300, and in some embodiments, an authority for controlling the food provider 100 may be given to the expert terminal 500, but the inventive concept is not limited thereto.

In the inventive concept, the terminal may refer to all calculation units, such as a desktop computer, a notebook computer, a smartphone, a PDA, a mobile phone, and a gaming device, which may collect, read, process, refine, store, and display data, and in particular, the terminal may be a device that functions to execute software written in a decodable code and deliver the software to the user by displaying the software and may store the software or read the software together with the data from the outside if necessary.

In detail, a function of managing the health of an animal according to the animal housebreaking system according to the second embodiment of the inventive concept will be described.

If the defecation information of the animal is transmitted from the animal housebreaking device 200 to the food provider 100, the food provider 100 may not only discharge a predetermined food through the food discharge unit 103 but also transmit the defecation information received from the animal housebreaking device 200 to the server 300.

Meanwhile, the information transmitted from the food provider 100 to the server 300 is not limited to defecation information, but the information related to a food provision situation provided by the food provider 100 may be also provided to the server 300.

In detail, the food provider 100 may measure the amount of intake of the animal through the weight sensor 104 and transmit the measurement contents to the server 300. Accordingly, because the food provision situation related information as well as the defecation information is stored in the server 300, the owner of a pet and an animal expert may inquire the contents stored in the server 300 from their terminals.

Accordingly, the owner of the pet at the outside may identify a defecation situation through the user terminal 400 even when the owner is outdoors, and when an abnormality of the defecation activity of the animal is detected, may request the contents that request a review on the abnormality to the animal expert from the server 300.

The request for consultation is transmitted to the terminal 500 for an animal expert through the server 300, and the animal expert is entrusted an authority of inquiry of information on defecation of the corresponding animal and a food provision situation by the owner of the pet, may inquire the information related to the health of the animal from the terminal 500 for an animal expert and may store an expert opinion to the server 300. Meanwhile, the animal expert may inquire the corresponding animal related data through the server 300 only when the owner of the animal sets an entrustment of the inquiry of data.

Then, as described above, the intake information of the animal during a specific period of time, which has been received from the food provider 100, may be provided to the remote animal expert to be helpful in accurately recognizing the health state of the animal by the animal expert and may be utilized as a service for management of the obesity of the animal Meanwhile, the owner of the pet may identify the expert opinion through the user terminal 400, and may transmit a command for taking a measure, such as adjustment of the amount of food supplied by the food provider 100, which is located at home, through a remote control. Then, the command may be transmitted to the food provider 100 through the server 300, and in some embodiments, may be directly transmitted from the user terminal 400 to the food provider 100.

The controller 102 of the food provider 100 may discharge a food through the food discharge unit 103 or change the kind of a food provided from the food provider 100 while measuring the amount of the food by using the weight sensor 104 of the food provider 100 when the food is supplied to the animal, by reflecting a command or contents transmitted from the user terminal 400.

Thereafter, the amount of the currently left food or water measured through the weight sensor 104 or the amount of the food or water taken by the animal is delivered to the user terminal 400 through the communication unit 101 of the food provider 100, the user may determine the amount of the food or water that is to be provided to the animal with reference to the information and then may transmit the determined amount of the food or water to the food provider 100. The food provider 100 may receive an instruction of the user through the communication unit 101, and the controller 102 interprets the instruction to control the food discharge unit 103 to give a feed corresponding to the commanded amount. As described above, after the amount (or weight) of the food or water taken by the animal or the amount (or weight) of the food or water currently left is acquired through the sensor 103 mounted on the food provider, and the user is informed of the contents through the server 300.

Meanwhile, in some embodiments, the food stored in the food provider 100 may be managed such that the food is not lack by providing a function of, when the amount of the food stored in the food discharge unit 103 of the food provider 100 is a threshold value or less, informing the user terminal 400 of the owner of the animal of the fact.

Figure 3:
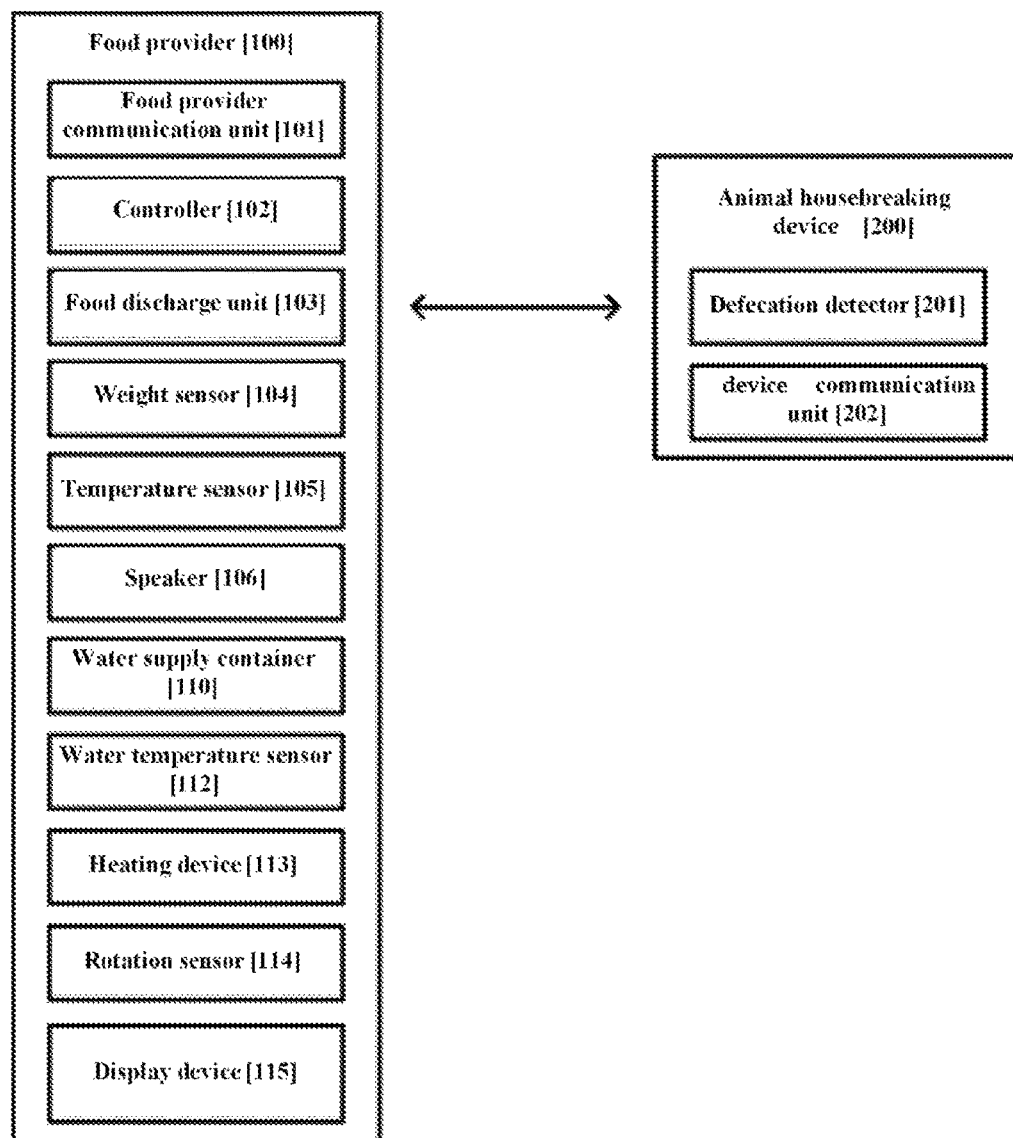
FIG. 3 is a block diagram schematically illustrating a configuration of an animal housebreaking system according to a third embodiment of the inventive concept.

Hereinafter, an animal housebreaking system according to a third embodiment of the inventive concept will be described with reference to FIG. 3. Meanwhile, a difference between the animal housebreaking system according to the first embodiment of the inventive concept and the animal housebreaking system according to the second embodiment of the inventive concept, and the animal housebreaking system according to the third embodiment of the inventive concept will be mainly described. Referring to FIG. 3, a block diagram schematically illustrating a configuration of the animal housebreaking system according to the third embodiment of the inventive concept is disclosed, and referring to FIG. 4, a view illustrating a schematic configuration of the food provider include in FIG. 3 is disclosed.

The food provider 100 includes a display device 115 that is driven according to a control signal of the server 300 that receives a command of the user by using the user terminal 400 or the expert terminal 500 through a network and displays a broadcasting channel for animals or a video desired by the user according to a remote control of the user, a rotation sensor 114 for detecting a physical impact applied to the food provider 100, a water supply container 110 for providing water, a water temperature sensor 112 installed in the water supply container 110, and a heating device 113 for preventing the water accommodated in the water supply container 110 from being frozen.

Here, the display device 115 is configured to display a broadcasting channel for animals provided from the server 300 through the network or a video stored in the server 300 by the user in advance according to a remote control of the user using the user terminal 400, it may alleviate the loneness of the animal.

Further, the display device 115 may further include a camera that photographs a surrounding image of the display device 115 such that the user may identify the state of the animal in real time through the user terminal 400, and preferably, the animal may be easily managed by identifying the state of the animal through the image captured by the camera and providing dialogues between the user and the animal by using the speaker 106.

Further, because the rotation sensor 114 is configured to transmit a detection signal to the controller 102 when a physical impact is applied to the food provider 100 in order that the animal extracts a feed, it functions to control the action of the animal by outputting a voice for restraining the action of the animal from the speaker 106 under the control of the controller 102 that received the signal transmitted from the rotation sensor 114.

Further, the water supply container 110 is installed in the interior of the food provider 100 to provide water to the animal, and preferably, includes a known fully automatic discharge unit that is in an accommodation form to discharge a specific amount of water to the outside as the tongue of the animal contacts the water supply container 110 on one side thereof.

In some embodiments, the temperature sensor 105 is installed on one side of the water supply container 110 which the tongue of the animal contacts when the animal takes the water accommodated in the interior of the water supply container 110 to measure a temperature of the tongue of the animal when the tongue contacts the temperature sensor 105 and transmit the measured information to the server 300 through the food provider communication unit 101.

Further, the water temperature sensor 112 is installed in the interior of the water supply container 110, in which the water is accommodated, to measure the temperature of the water accommodated in the water supply container in real time and transmit the measured information to the server 300 through the communication unit 101.

Accordingly, the user may easily acquire the information on the temperature of the animal or the temperature of the water stored from the server 300 through the user terminal 400, and may manage the state of the animal while recognizing the state of the animal in real time by using the acquired information.

Further, the heating device 113 is provided inside or outside the water supply container 110 to heat the water accommodated in the water supply container such that the water stored in the water supply container 110 is prevented from being frozen in winter based on the temperature measured by the water temperature sensor 112 when the food provider 110 is located outdoors.

Figure 4:
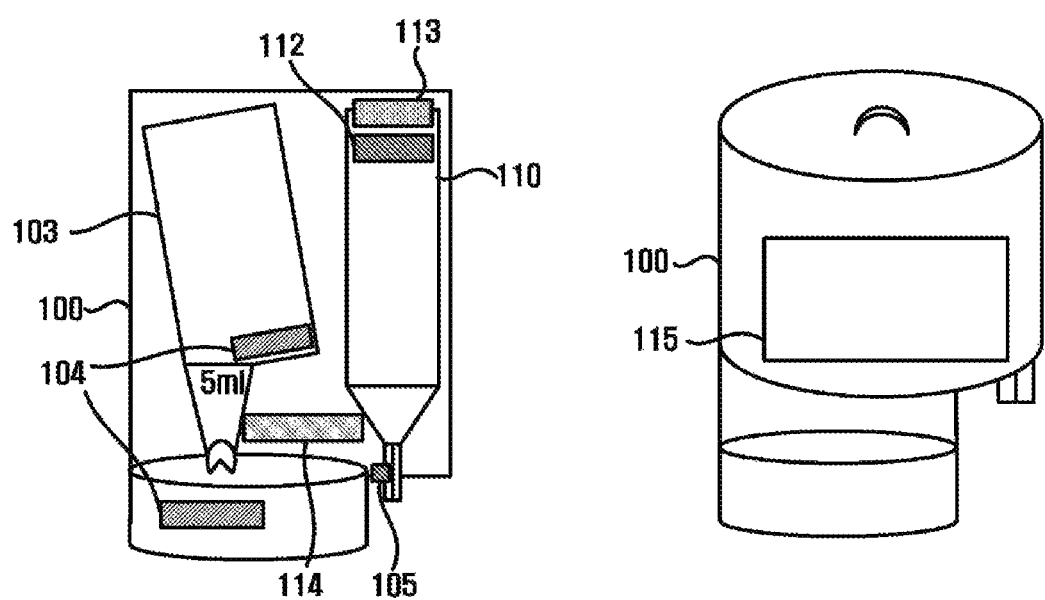
FIG. 4 is a diagram illustrating a schematic configuration of a food provider included in FIG. 3.

Meanwhile, although FIG. 4 illustrates that the weight sensors 104 are installed both inside and outside the food discharge unit 103, the inventive concept is not limited thereto and the weight sensor 104 may be installed inside or outside the food discharge unit 103.

The following effects may be obtained according to the inventive concept, but the effects of the inventive concept are not limited thereto.

First, the animal may be easily housebroken in a remote control without direct intervention of a person.

Second, because a food may be automatically provided to the animal or a voice of the owner that praises the animal may be given to the animal if the animal defecates on the housebreaking device, the animal may be efficiently housebroken and a time for the owner to housebreak the animal may be reduced.

Third, the animal may be sanitarily managed by inducing the animal to defecate on a specific defecation pad.

Fourth, the health of the animal may be systematically managed by using corresponding information by storing information on the components of the defecation of the animal and the history of the defecation activities.

The aspect of the inventive concept is not limited thereto, and other unmentioned aspects of the inventive concept may be clearly appreciated by those skilled in the art from the following descriptions.

Although the exemplary embodiments of the inventive concept have been described with reference to the accompanying drawings, it will be understood by those skilled in the art to which the inventive concept pertains that the inventive concept can be carried out in other detailed forms without changing the technical spirits and essential features thereof. Therefore, the above-described embodiments are exemplary in all aspects, and should be construed not to be restrictive.

What is claimed is:

1. An animal housebreaking system comprising:
an animal housebreaking device including a defecation detector configured to
detect whether an animal defecated on the animal housebreaking device,
generate defecation status information when the defecation by the animal is detected, and
transmit the generated defecation status information to a food provider;
the food provider configured to
store two of more kinds of foods,
receive the defecation status information on whether the animal defecated, from the animal housebreaking device,
select a kind of food to be dispensed as a reward, from the stored two of more kinds of foods, and provide the selected kind of food as the reward when the animal defecated on the animal housebreaking device;
a server that
is physically separated from the food provider,
performs wireless communication with the food provider,
store the defecation status information transmitted from the food provider,
provide the transmitted defecation status information to connected terminals, and
receive a commend for controlling the food provider from the terminals; and
an expert terminal that
is physically separated from the food provider and the server,
performs wireless communication with the server,
receives the defecation status information from the server,
displays the received defecation status information,
receives an input of an expert opinion on the defecation status information, the expert opinion includes an opinion on health of the animal determined based on the received defecation status information, and
transmits the received input to the server; and
a user terminal that
is physically separated from the food provider and the server,
performs wireless communication with the server,
receives the defecation status information and the expert opinion on the health of the animal, from the server,
displays the received defecation status information and the received expert opinion,
receive an input for selecting the kind of food to be dispensed as the reward or an input for changing an amount of the food to be disposed as the reward, and
transmits the received input to the server.

2. The animal housebreaking system of claim 1, wherein the predetermined reward further includes a predetermined voice.

3. The animal housebreaking system of claim 1, wherein the food provider includes:
   a food discharge unit configured to discharge a food stored in the food provider such that the animal takes the food; and
   a controller configured to control the food discharge unit to discharge the food when the animal defecates on the animal housebreaking device, based on the received information on whether the animal defecated.

4. The animal housebreaking system of claim 3, further comprising:
   a weight sensor configured to be sensing a weight of the food dispensed from the food discharge unit and adjusting, via the controller, the dispensed amount until a desired weight is reached.

5. The animal housebreaking system of claim 1, wherein the food provider includes:
   a display device configured to display a broadcasting channel for animals or a video desired by a user according to a remote control of the user.

6. The animal housebreaking system of claim 1,
   wherein the defecation detector is further configured to
      detect at least one of a defecation weight and a defecation state,
      generate the defecation status information based on a result of the detection, and
      transmit the generated defecation status information to the food provider, and
   wherein the food provider is further configured to
      select, based on the defecation status information, the kind of food to be dispensed as the reward, from the stored two of more kinds of foods, and
      dispense the selected kind of food as the reward.

7. The animal housebreaking system of claim 6, wherein the food provider is further configured to adjust an amount of the selected kind of food based on the defecation status information, and dispense the adjusted amount of the selected kind of food as the reward.

* * * * *